(12) United States Patent
Hanot

(10) Patent No.: US 7,934,922 B2
(45) Date of Patent: May 3, 2011

(54) DEVICE AND METHOD FOR COMPRESSION MOULDING PLASTIC ARTICLES

(75) Inventor: Dominique Hanot, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 0 days.

(21) Appl. No.: 12/299,089

(22) PCT Filed: Apr. 24, 2007

(86) PCT No.: PCT/IB2007/051511
§ 371 (c)(1),
(2), (4) Date: Jan. 16, 2009

(87) PCT Pub. No.: WO2007/125480
PCT Pub. Date: Nov. 8, 2007

(65) Prior Publication Data
US 2009/0160093 A1    Jun. 25, 2009

(30) Foreign Application Priority Data

May 1, 2006    (EP) ..................................... 06113343
Jun. 13, 2006    (EP) ..................................... 06115409

(51) Int. Cl.
*A01J 21/00* (2006.01)
(52) U.S. Cl. ..................... 425/466; 425/125; 425/126.1; 425/461; 425/467; 425/256; 425/449; 425/DIG. 10
(58) Field of Classification Search .................. 425/125, 425/126.1, 461, 466, 477, 256, 449, DIG. 10
See application file for complete search history.

(56) References Cited

U.S. PATENT DOCUMENTS

| 3,313,875 A | * | 4/1967 | Magerle | ......................... 264/267 |
| 3,591,896 A | | 7/1971 | Tartaglia | |
| 4,943,405 A | * | 7/1990 | Keller et al. | ................... 264/322 |

FOREIGN PATENT DOCUMENTS

| DE | 38 04 464 | | 6/1989 |
| DE | 10349837 A1 | * | 5/2004 |
| WO | 96 09 151 | | 3/1996 |
| WO | 96/09151 | | 3/1996 |

OTHER PUBLICATIONS

English Translation of International Preliminary Report on Patentability (IPRP) for PCT/IB2007/051511, mailed Dec. 4, 2007.
International Search Report for PCT/IB2007/051511, mailed Dec. 4, 2007.
Office Action dated Oct. 26, 2009, from U.S. Appl. No. 12/299,086.
English Translation of International Preliminary Report on Patentability (IPRP) for PCT/IB2007/051513, mailed Nov. 23, 2007.

* cited by examiner

*Primary Examiner* — Philip C Tucker
*Assistant Examiner* — Amjad Abraham
(74) *Attorney, Agent, or Firm* — Nixon & Vanderhye P.C.

(57) ABSTRACT

The invention relates to a device for moulding a plastic article in which the article is obtained by the compression of a quantity of plastic material (3) in the molten state between the two parts of a mould, comprising at least one supply of plastic material (1), a rod (11), sliding in a sleeve (8) suitable for temporarily supporting said quantity of plastic material (3), a mould for the head of the article (6, 7) and a mandrel (18) cooperating with said mould (6, 7), characterized in that it comprises non-elastic retaining means (12-14, 23, 24) which are suitable for limiting the bidirectional displacement of the rod (11) in the sleeve (8). The invention also relates to a method using the aforementioned device.

18 Claims, 10 Drawing Sheets

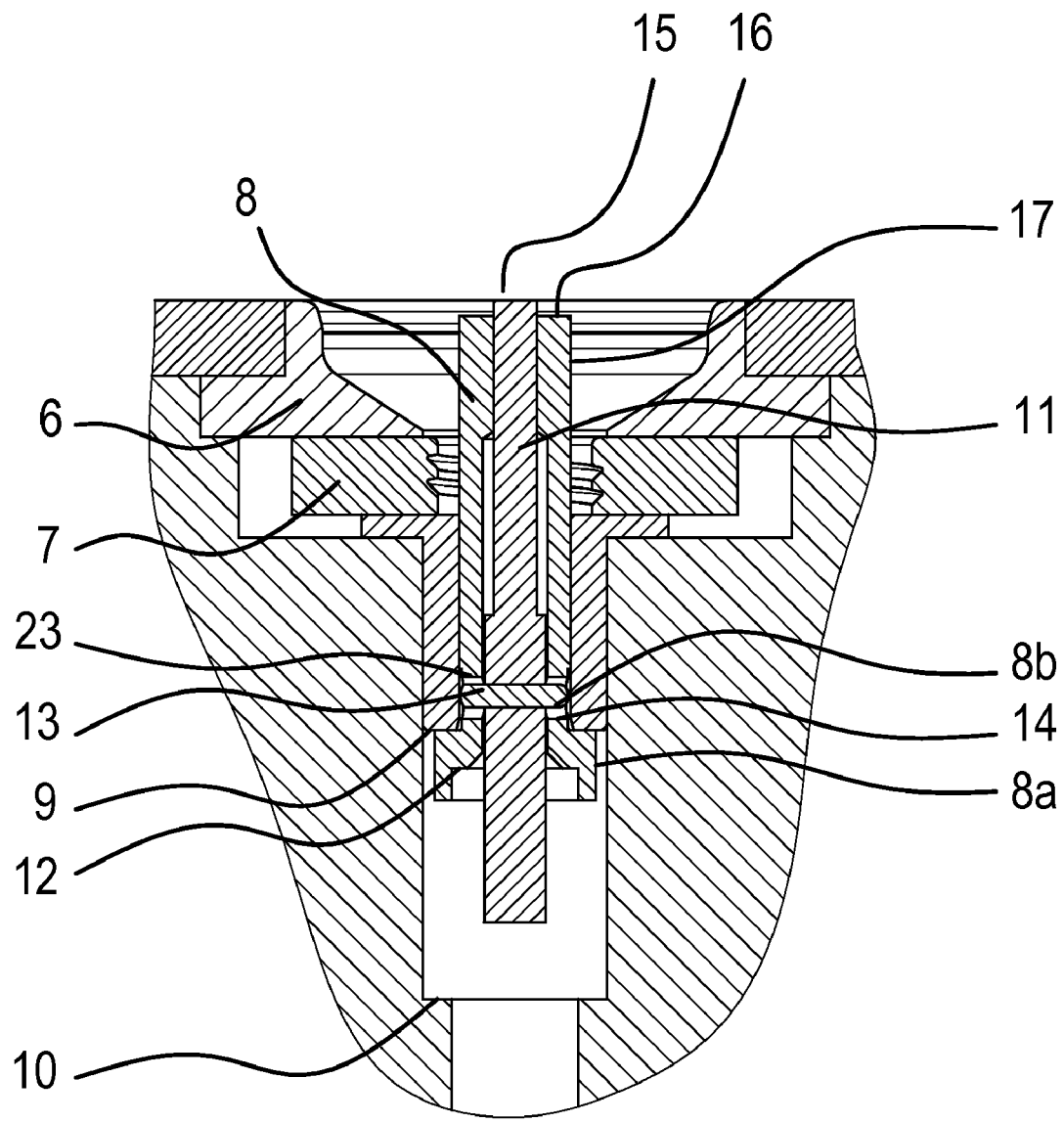
Fig.1.A

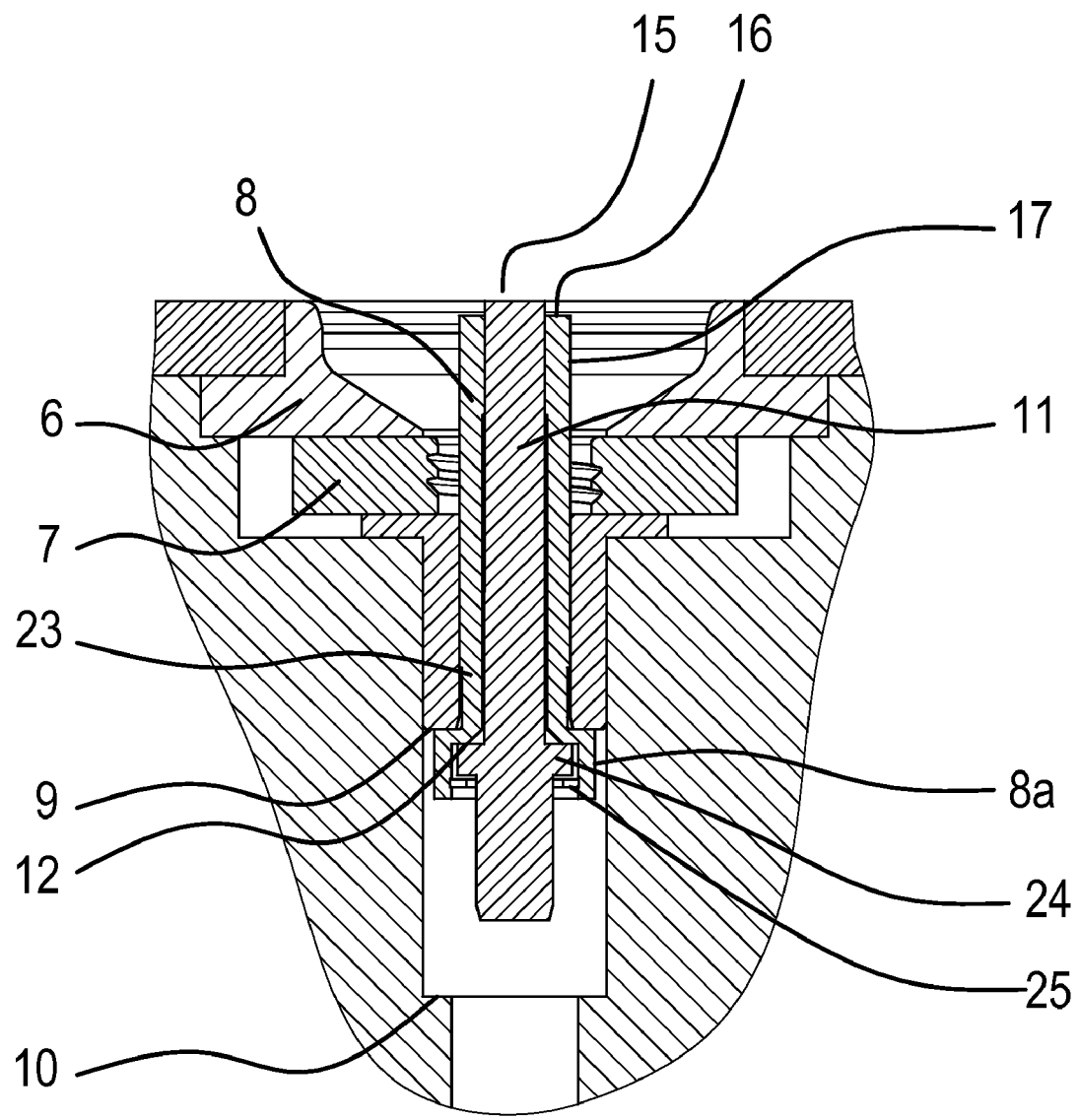
Fig.1.B

DEVICE AND METHOD FOR COMPRESSION MOULDING PLASTIC ARTICLES

This application is the U.S. national phase of International Application No. PCT/IB2007/051511, filed 24 Apr. 2007, which designated the U.S, and claims priority to European Application Nos. 06113343.5, filed 1 May 2006, and 06115409.2, filed 13 Jun. 2006, the entire contents of each of which is hereby incorporated by reference.

FIELD OF THE INVENTION

The present invention relates to a system and a method for compression moulding plastic articles, in which the part is obtained by the compression of a portion of plastic material in the molten state between the two parts of a mould.

The present invention is applied more particularly to the production of plastic tubes, for example for toothpaste or cosmetics, the tube being formed from a flexible cylindrical body attached to a head comprising a shoulder and an orifice. In this particular case, the head of the tube is formed and simultaneously welded to the body in one operation. The head of the tube is produced from a quantity of molten material which is moulded and compressed between a lower tool known as the die assembly and an upper tool known as the mandrel, onto which the flexible cylindrical body is fitted. The temperature of the material is such that it is welded to the body of the tube. In a machine for producing tubes, a plurality of moulds are generally moved by a discontinuous (or continuous) movement, each mould being subjected to the different steps of the method (loading of the tube body, depositing the quantity of plastic material, compression moulding, cooling, demoulding and discharge of the tube).

PRIOR ART

Devices and methods for producing such tubes are known in the prior art.

By way of example, the U.S. Pat. No. 4,943,405, U.S. Pat. No. 4,352,775 and the application DE 103 49 837 disclose methods and devices in which the quantity of material is deposited around a rod forming the orifice of the tube, the contents of these publications being incorporated by way of reference in the present application as regards the description of said methods and devices.

More particularly, in the U.S. Pat. No. 4,943,405, and as shown in FIG. 1 thereof, a quantity of plastic material in annular form is deposited from a supply of material onto the upper face of a sleeve and around the rod which is used to form the orifice in the shoulder. The outlet of the supply of material is surrounded by an annular nozzle which allows the projection of pressurized air to separate the quantity of deposited material from the supply of material, once the desired quantity of material has been deposited. Once the quantity of material has been deposited on the sleeve, the supply of material is removed and a mandrel is introduced which has the shape of the shoulder to be created. The front face of the mandrel comes into contact with the upper face of the rod and the sleeve-rod assembly is pushed back inside the shoulder die and thread-forming die to form the head which is to become the end of the tube. FIGS. 3 and 4 of this patent illustrate this step of forming the head and the welding thereof on the body of the tube carried by the mandrel. The orifice of the head is formed by the rod which is longitudinally displaced in the sleeve. During this step of forming the head and the displacement of the mandrel in the die, the rod is pushed back axially into the sleeve by the mandrel from an upper position to a lower position in which it is used to form an orifice in the shoulder by protruding beyond the upper face of the sleeve.

One problem encountered in the device disclosed in this patent relates to the relative positioning of the rod in the sleeve. Although it is guided and slides freely in the axial direction, this sliding means that it is not possible to be sure of its position, in particular the position of its upper face relative to the upper face of the sleeve. Nevertheless, this position is very important since it is by this relative positioning that the orifice is formed in the head. The thickness of the material around the orifice is important since it is this which determines the relative position which the sleeve and the rod have to adopt. Inaccurate positioning results in malformed heads, in particular without an orifice.

The U.S. Pat. No. 4,352,775 discloses a further device and method for producing tubes. In this publication, a quantity of material in annular form is deposited directly onto the bottom of the die which has the form of the head surrounding the rod which will form the orifice. The rod is maintained in the upper position by means of a spring and is pushed back against the force of the spring when the mandrel is introduced into the die to form the head. Said device does not comprise a sleeve serving as an intermediate support for the quantity of material, which reduces the centring precision for depositing of the quantity of material in the mould. Moreover, the absence of an intermediate support has the result of rapid cooling of the portions of the quantity of material which directly come into contact with the walls of the mould. This variation in temperature inside the quantity of material may cause a deformation of the moulded articles.

The application DE 103 49 837 discloses a further device and method for the production of tubes with a rod and a sleeve comparable to those disclosed in the aforementioned U.S. Pat. No. 4,943,405. In this German publication, the rod may be displaced axially by sliding in the sleeve and is mounted on a spring to maintain it in the upper position relative to the sleeve. When the mandrel is introduced into the die to form the shoulder, the rod is pushed back against the force of said spring.

The problem which is encountered in the U.S. Pat. No. 4,943,405 and the application DE 103 49 837 is associated with uncontrolled sliding of the rod in the sleeve, in particular when the mandrel bears against the front face of the rod and the displacement thereof in the die. This phenomenon may hamper the creation of an orifice in the object to be moulded (typically when the rod is completely retracted into the sleeve). It may also cause a non-uniform or inadequate distribution of the quantity of material on the sleeve.

In the particular case of tubes having an orifice of small diameter, less than 1.5 mm and for example 0.8 mm, the devices disclosed by the U.S. Pat. No. 4,943,405 and U.S. Pat. No. 4,352,775 do not allow the production of these tubes in a reliable manner. More specifically, in this configuration, the protruding length and the small diameter of the orifice rod is such that it is subjected to buckling which may result in breaking when the mandrel comes to bear against the upper face thereof. The orifice rods may frequently break which repeatedly causes a halt in production, and in addition the rod pieces are liable to damage other parts of the mould during the closure thereof.

Thus one of the principal objects of the invention is to improve the known methods and devices and in particular to be able to produce reliably tubes with orifices of small diameters without the risk of breaking the orifice rods.

One of the objects of the invention is to propose a system allowing improved control of the position of the rod relative to the sleeve, in particular during the formation of the shoulder by the mandrel.

A further object of the invention is to propose a method for forming shoulders of tubes which is more efficient than the known methods.

GENERAL DESCRIPTION OF THE INVENTION

The invention, therefore, relates to a device for moulding a plastic article in which the article is obtained by the compression of a quantity of plastic material in the molten state between the two parts of a mould, comprising at least one supply of plastic material, a rod, sliding in a sleeve suitable for temporarily supporting said quantity of plastic material, a mould for the head of the article and a mandrel cooperating with said mould. The device according to the invention is distinguished from the prior art by the fact that it comprises non-elastic retaining means which are suitable for limiting the bidirectional displacement of the rod in the sleeve.

The displacement of the rod, more precisely the extreme positions thereof, is perfectly controlled using the device according to the invention. It is possible, in particular, always to maintain the rod in a position which avoids the blocking of the orifice of the shoulder during its formation.

These advantages were not able to be obtained with the devices of the prior art which either did not comprise means for retaining the rod in the upper and lower position, or comprised flexible retaining means (for example springs) which could not guarantee a precise relative positioning of the orifice rod with regard to the sleeve.

DETAILED DESCRIPTION OF THE INVENTION

The invention will be better understood by the following description of an embodiment thereof and the accompanying figures, in which:

FIG. 1A shows a variant of the embodiment of FIG. 1,

FIG. 1B shows a variant of the embodiment of FIG. 1,

Figure 2:
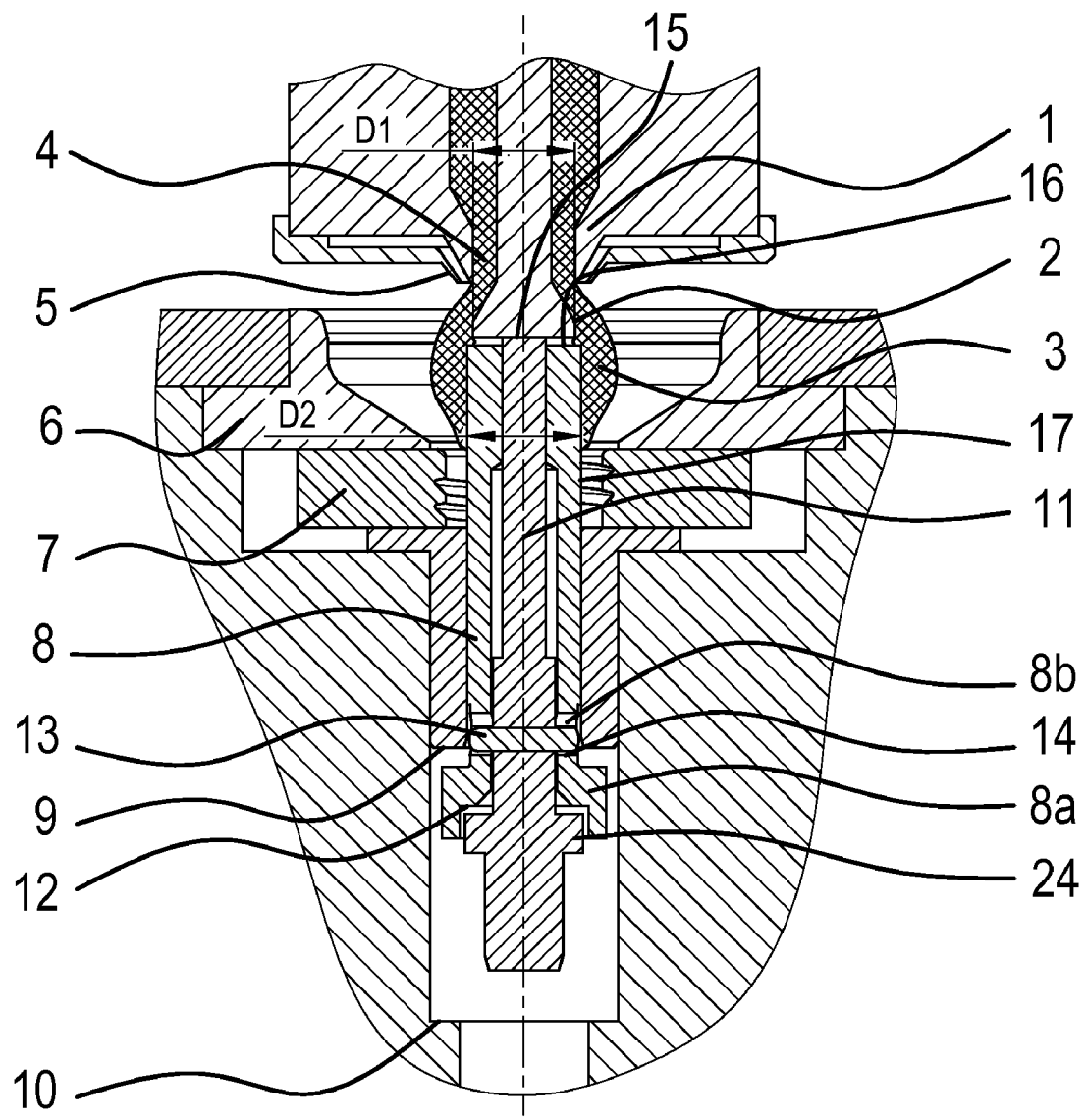
Figure 3:
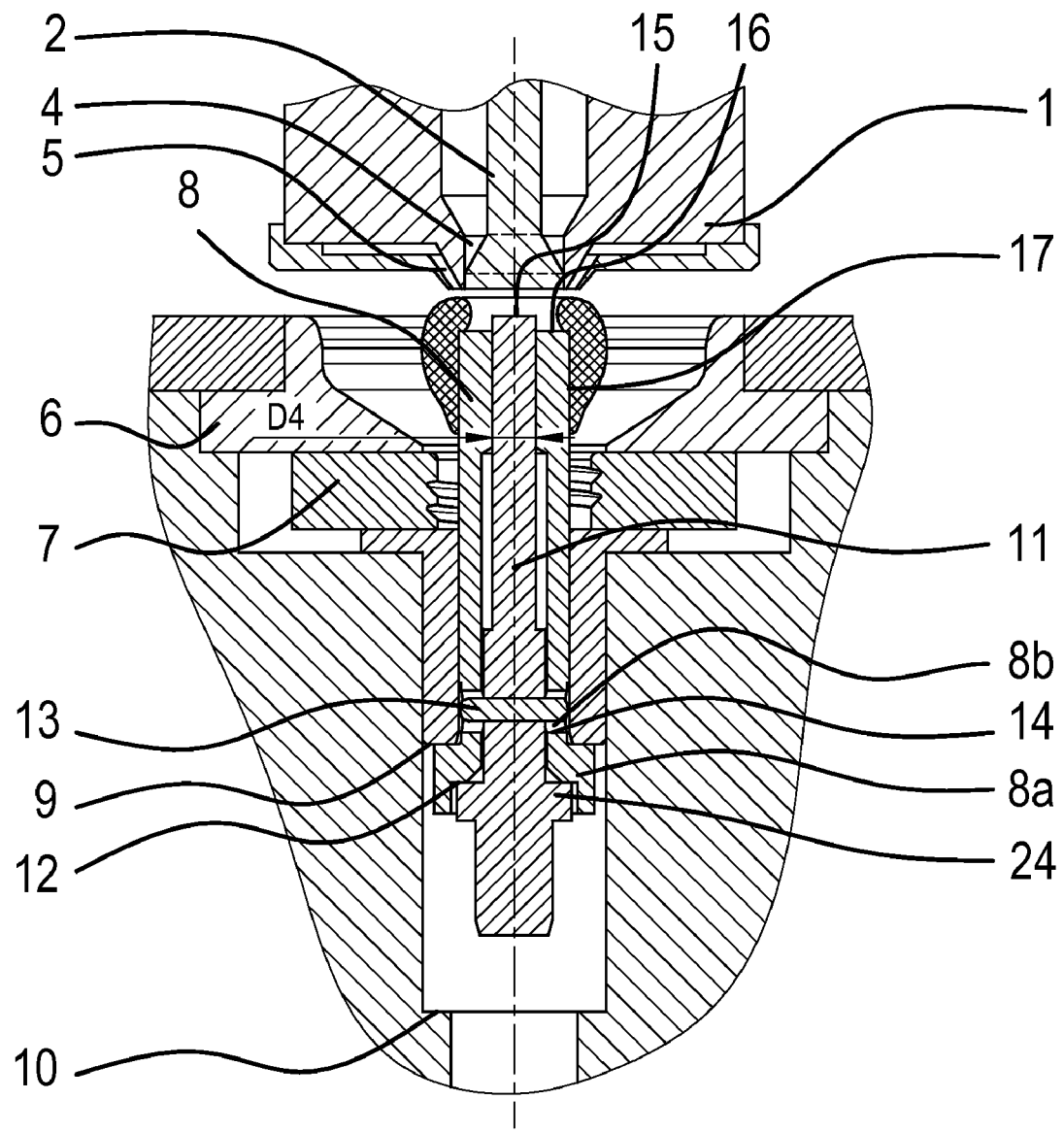
Figure 4:
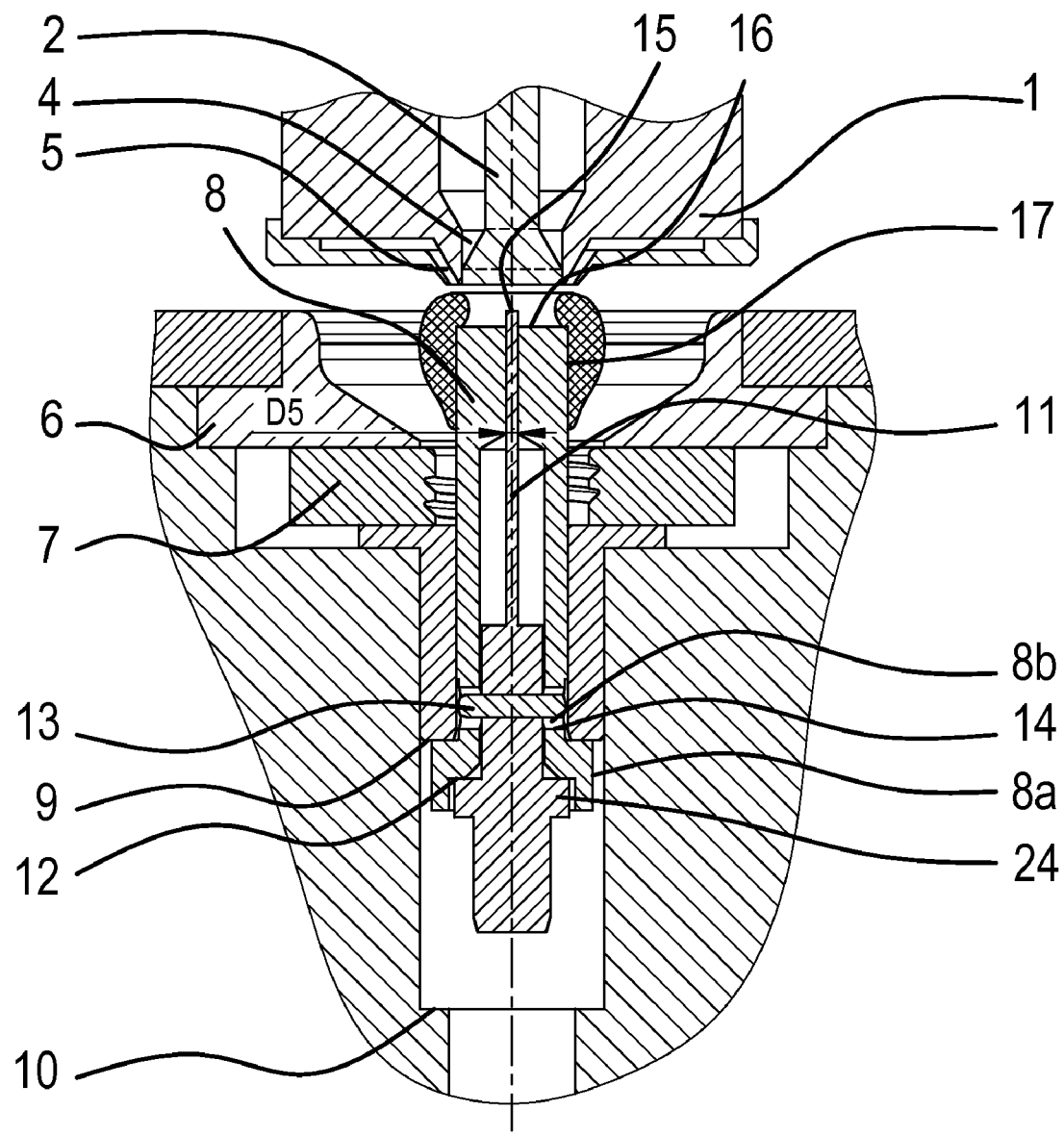
Figure 5:
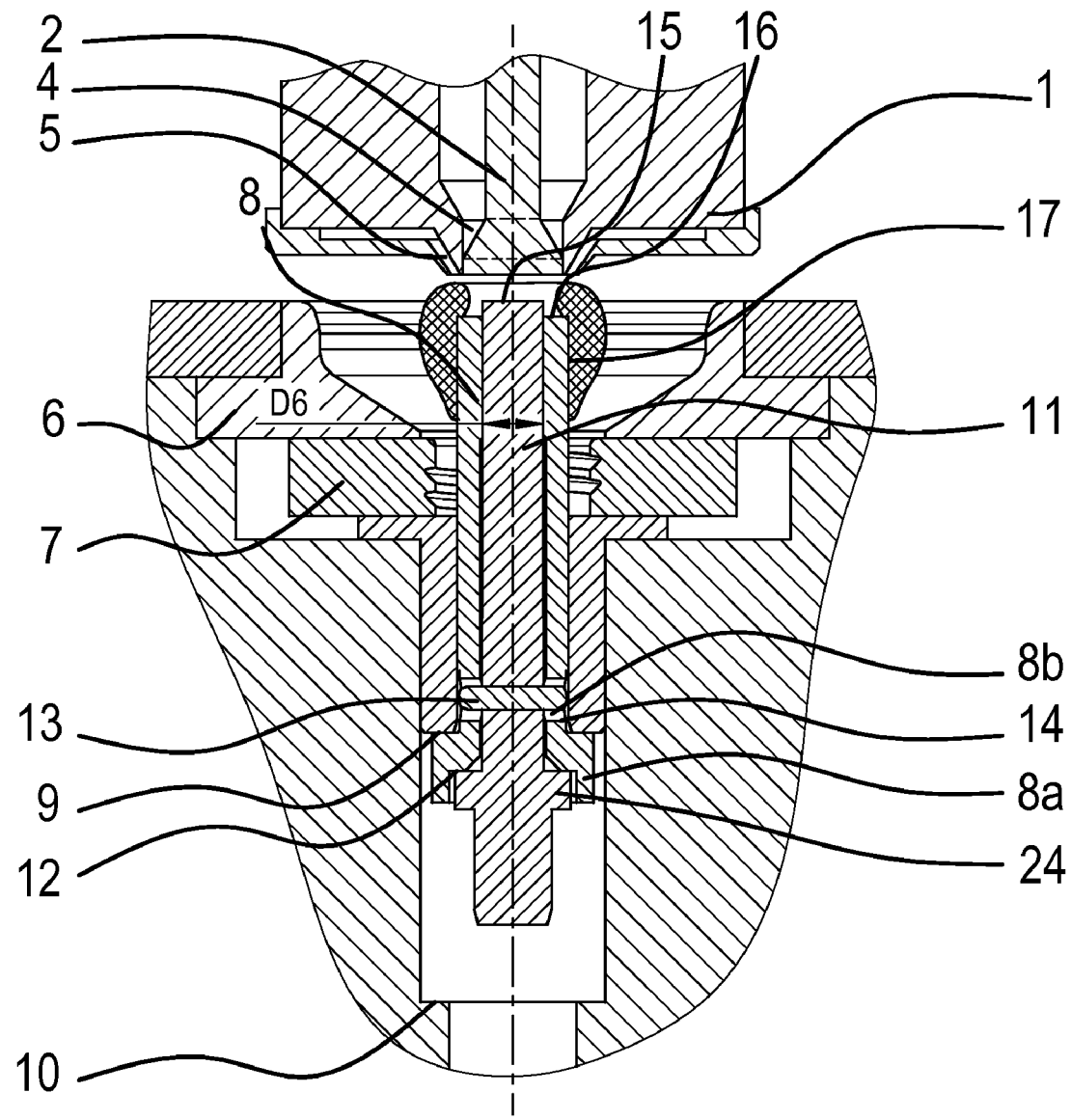
Figure 6:
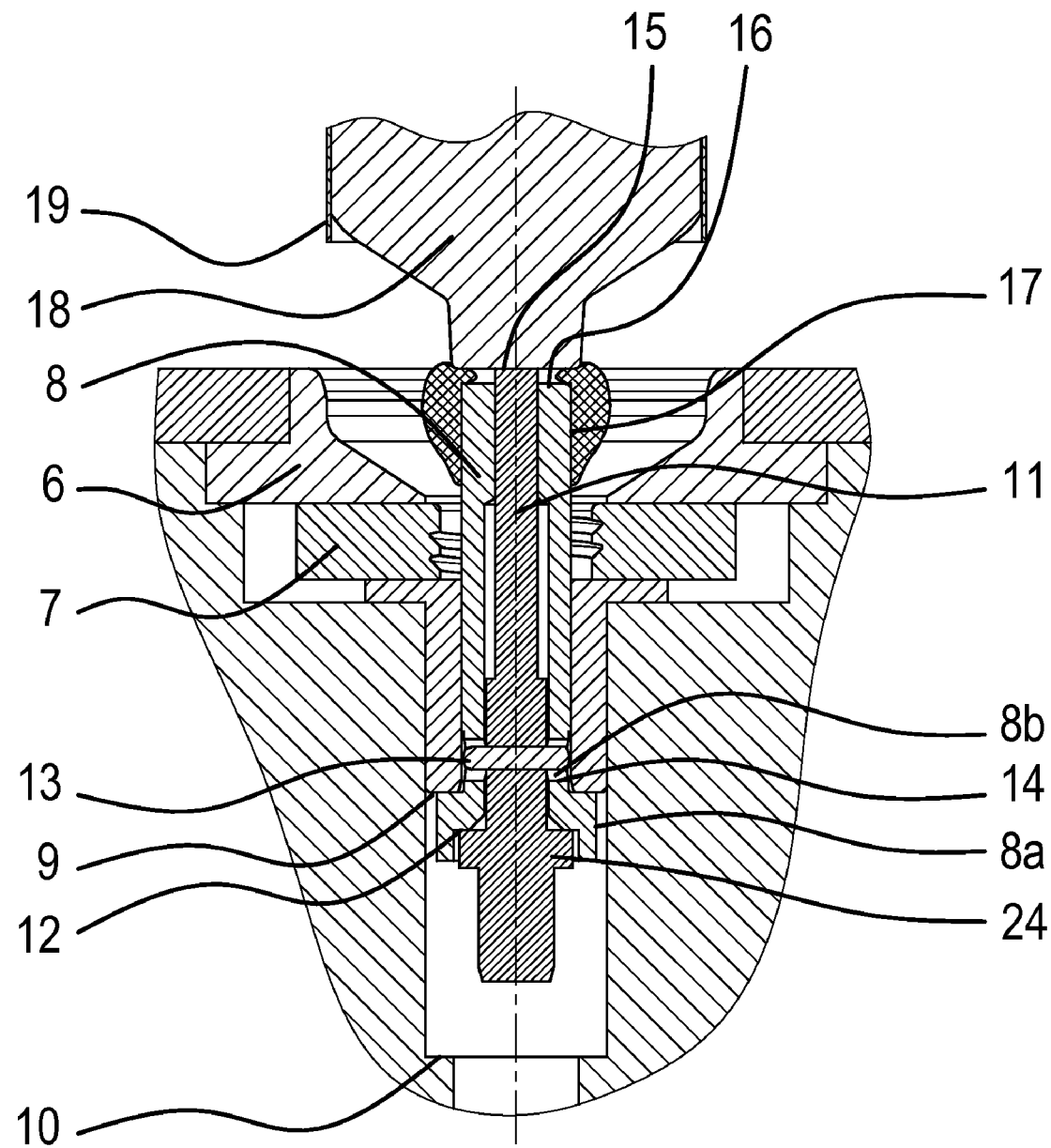
Figure 7:
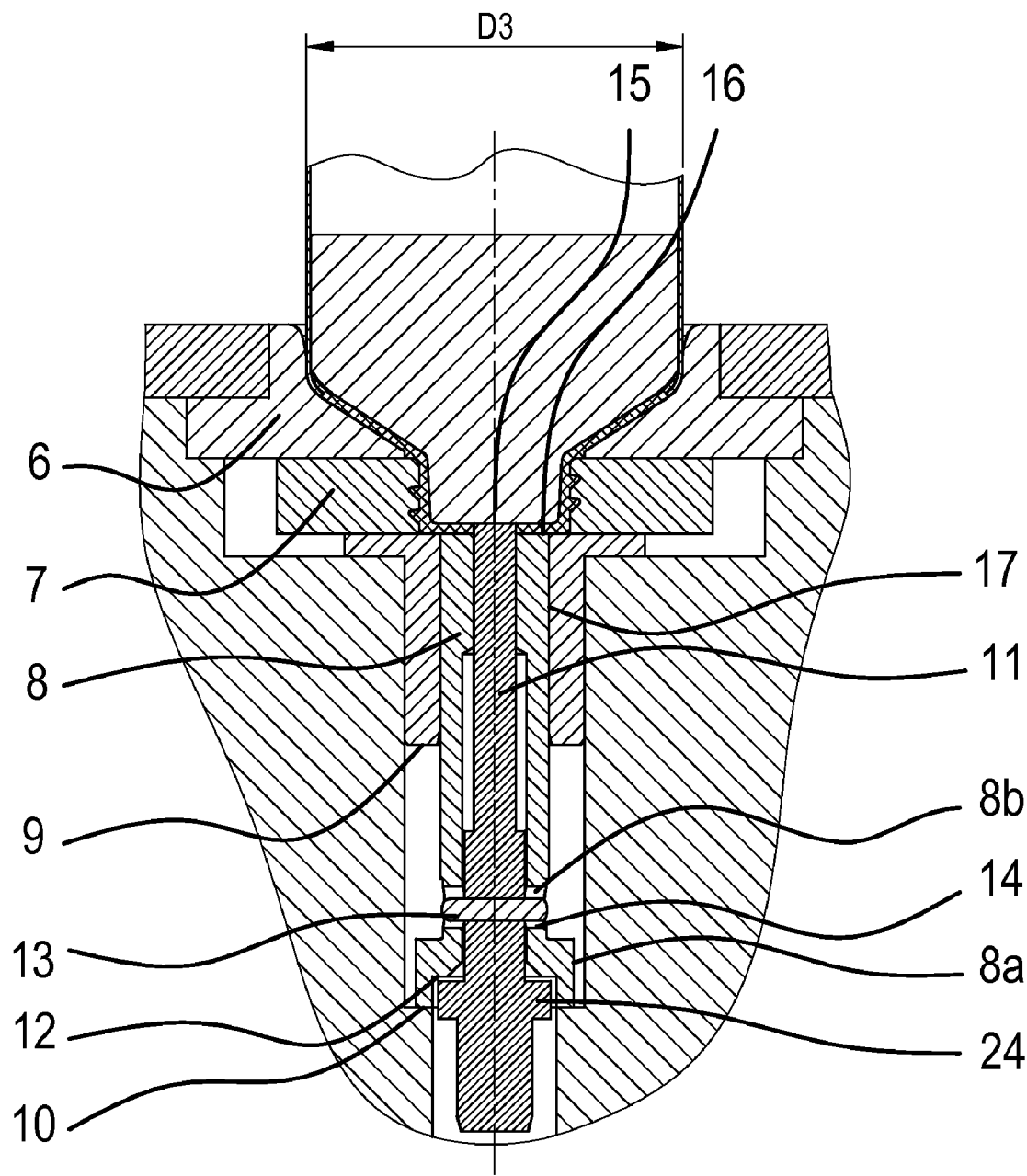
Figure 8:
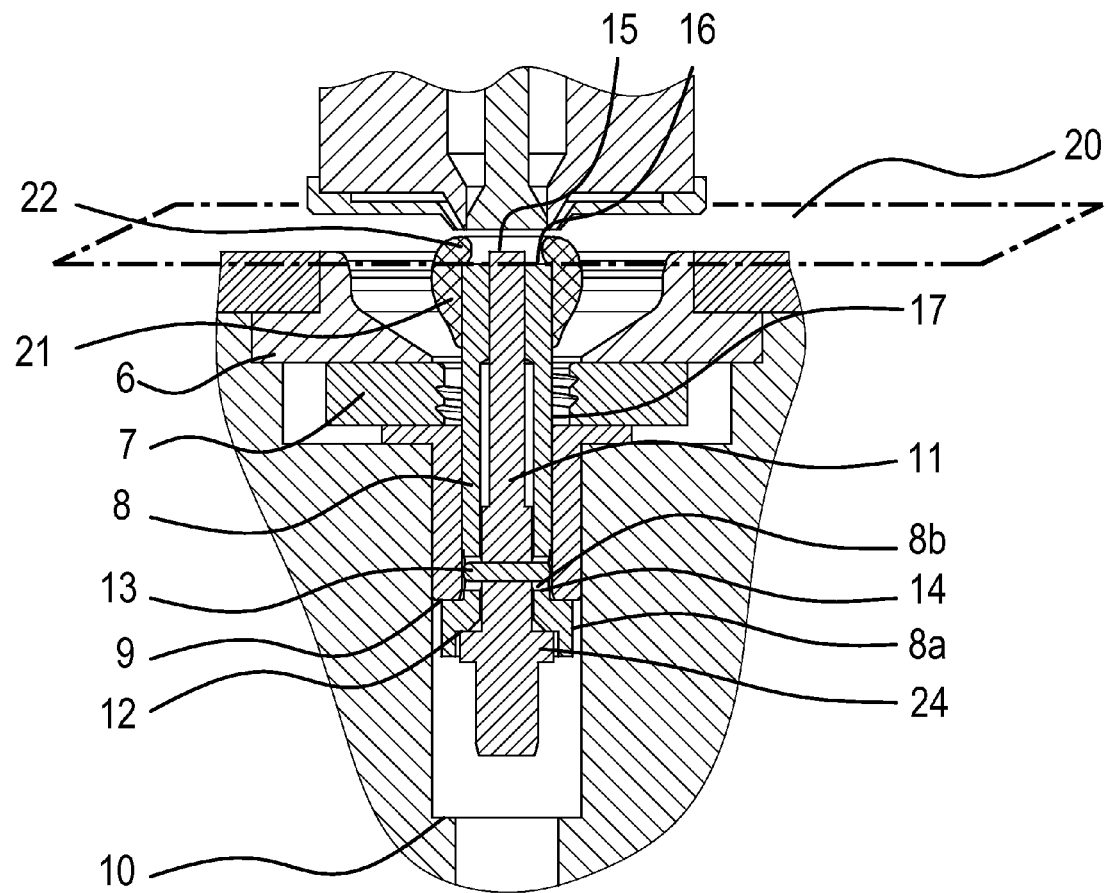

FIG. 2 shows an open metering nozzle forming a quantity of plastic material in the lower part of the mould, FIG. 3 shows a closed metering nozzle and the quantity of material in position in the lower part of the mould, FIG. 4 corresponds to FIG. 3 but with an orifice rod of small diameter, FIG. 5 corresponds to FIG. 3 but with an orifice rod of large diameter, FIG. 6 shows the mandrel and the die assembly at the start of the compression phase and FIG. 7 shows the end of the compression phase, FIG. 8 illustrates the manner in which the quantity of material is deposited on the sleeve.

Figure 1:
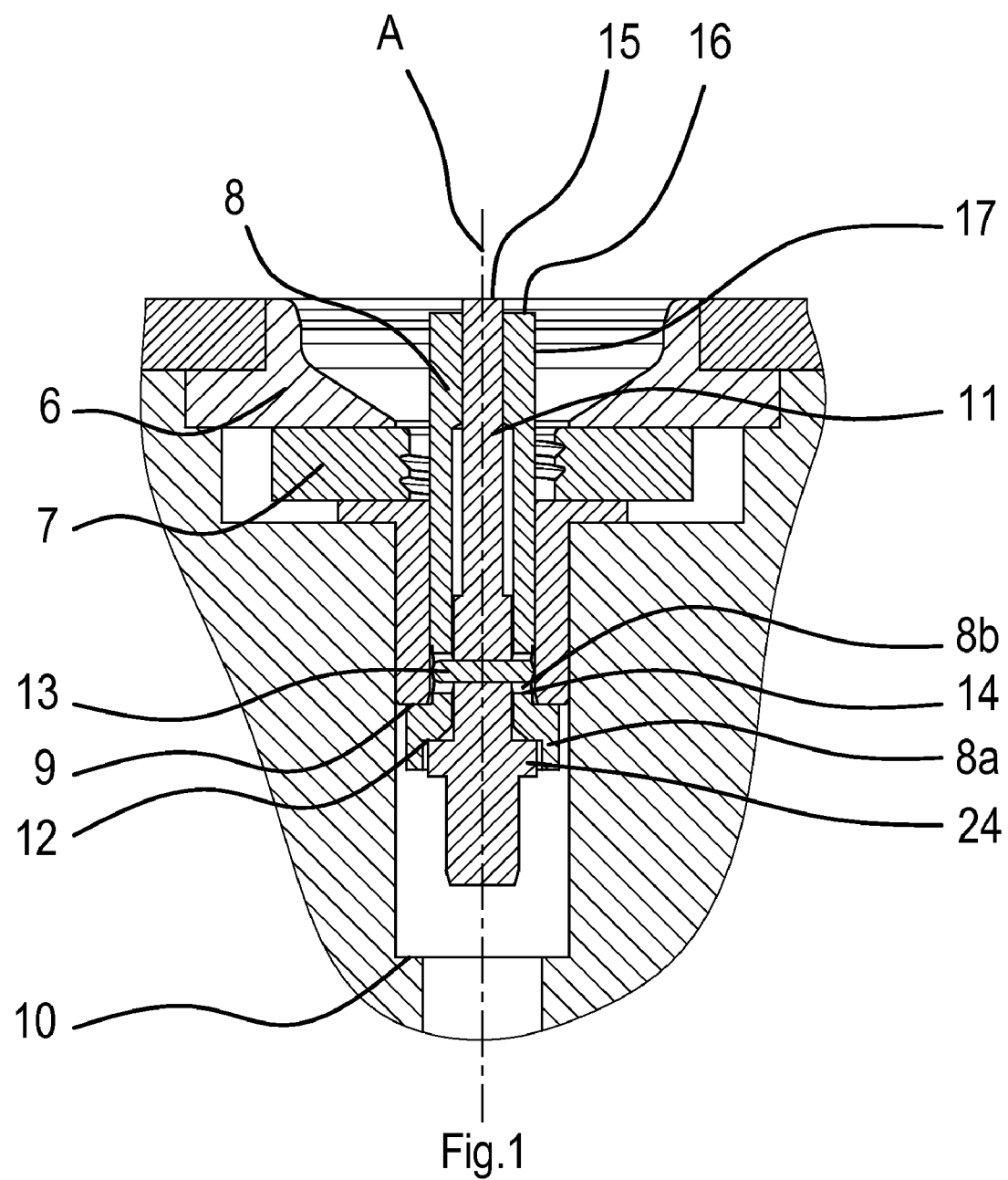
FIG. 1 shows the lower part of the mould, the die assembly.

FIG. 1 shows the lower part of the mould, known as the die assembly, in the resting position, comprising a shoulder die 6 which is to form the external part of the head of the tube, a thread-forming die 7 in a plurality of parts to allow the demoulding of the threaded portion and, within the axis of symmetry of the device, a sleeve 8 able to be displaced in translation according to the axis A. The sleeve 8 comprises a first shoulder 8a which limits its path between two stops 9 and 10.

The die assembly also comprises an orifice rod 11 which is used to form the orifice of the shoulder. The orifice rod 11 comprises a shoulder 24 in its lower part and may slide in the sleeve 8. The path of the orifice rod 11 is limited in the upper position by means of the shoulder 24 and by a stop 12 arranged on the sleeve. The path of the orifice rod 11 is also limited in the lower position by a pin 13, for example of cylindrical shape, and by a stop 14 arranged on the sleeve 8, the stop 14 being formed by the lower wall of an elongate hole 8b in said sleeve 8. The pin 13 is preferably placed, for example driven-in, perpendicularly into a hole in the rod 11. This pin allows the relative displacement in the axial direction of the rod 11 and the sleeve 8 to be blocked in a straightforward manner. This blocking is particularly important once the quantity of material has been deposited and the mandrel is in contact with the upper face of the rod, to form the shoulder. In the known systems using springs, in such a position, the rod was still able to be displaced, in particular under the effect of the material which is moulded by compression in this method and thus could give rise to faults, such as for example a blocked or deformed orifice or an orifice of diameter equivalent to the external diameter of the sleeve 8.

FIG. 1A shows a variant of the device of FIG. 1 in which the shoulder 24 of the orifice rod 11 is dispensed with and the upper stop 23 is produced by the contact of the cylindrical pin 13 on the upper wall of the elongate hole 8b. This variant has the advantage of a great simplicity of manufacture and implementation. By using a single pin for the two stops 14, 23, the construction of the device is simplified.

A further variant of the device may also be produced without the pin 13 (see FIG. 1B). In this case, the path of the orifice rod 11 is limited in the upper position by means of the shoulder 24 and by a stop 12 arranged on the sleeve. The path of the orifice rod 11 is limited in the lower position by a circlip 25 mounted in a groove of the lower part of the sleeve 8.

The relative displacements of the sleeve 8 and the orifice rod 11 are performed by an actuator (not shown) such as a spring or pneumatic cylinder acting on the orifice rod 11.

In FIGS. 2 and 3, the steps for depositing a quantity of molten plastic material are shown. A metering nozzle 1 positioned above the die 6 and concentric to the sleeve 8 forms a quantity 3 of molten plastic material. The metering nozzle 1 is supplied by an extruder (not illustrated) known in the prior art.

In FIG. 2, the valve 2 executes a linear path generated by an actuator (not illustrated) which allows the formation of an annular quantity of material 3 through the passage 4 and the depositing thereof on the upper face 16 and the periphery 17 of the sleeve 8.

In FIG. 3, the actuator subsequently drives the valve 2 in the reverse direction which causes the closure of the outlet orifice 4. The quantity of plastic material is cut and released by blowing a gas through the passage 5.

So that the quantity of plastic material 3 is correctly deposited on the sleeve 8 as FIG. 3 illustrates, i.e. so that it is in contact with its upper face 16 and its periphery 17, it is necessary to combine several conditions:

The distance between the upper face 15 of the orifice rod 11 and the upper face 16 of the sleeve 8 has to be slightly greater than the thickness of the corresponding wall of the moulded part (head of the tube).

The valve 2 has to be very close or preferably has to come into contact with the surface 15 of the orifice rod 11.

The diameter of the valve 2 is selected according to the diameter of the sleeve 8.

In the case of this invention, the quantity of material is deposited on the sleeve 8 (on the upper face 16 and on the periphery 17). It is, therefore, perfectly centred and is not liable to be displaced during the movements of the tools. Moulding errors are eliminated. In addition, if, for the same diameter of tube, the diameter of the orifice varies, it is possible to maintain the same diameter of metering valve because the diameter of the sleeve 8 remains identical (see FIG. 4 small orifice (D5), FIG. 5 large orifice (D6)). In factories for producing cosmetic tubes, it is usual that a production line produces a tube which is always of the same diameter but with frequent changes to the diameter of the orifice. The invention, therefore, makes it possible to gain time in the changing of tools as this avoids changing the diameter of the metering nozzle as well as further adjustments thereto. In addition, this allows the required range of diameters of metering nozzles to be reduced for the production of a range of tube diameters (for example if 6 different nozzles were necessary, the new method would only require 3 different diameters).

In the case of tubes with small orifices (see FIG. 4) the free length of the orifice rod 11 protruding beyond the upper face of the sleeve 16 is very short, typically of a length substantially equal to, even slightly greater than, the mandrel-sleeve distance when the mandrel has reached its lower position, which means that when the mandrel 18 comes into contact with the upper face 15 of the orifice rod 11, said orifice rod is acted upon only in compression and any risk of buckling is eliminated. The device thus allows tubes with very small orifices to be reliably produced.

In the following step shown in FIG. 6, the lower part of the mould, known as the die assembly and comprising the die 6 has left the metering nozzle 1 and a mandrel 18 is positioned above and centred relative thereto. The cylindrical body of the tube 19 is fitted in position on the mandrel 18. The mandrel 18 is displaced towards the die 6 and comes into contact with the orifice rod 11 on its upper face 15. It thus drives the assembly of the orifice rod 11 and the sleeve 8 until said sleeve bears against the stop 10 (see FIG. 7). During this displacement, the cylindrical pin 13 may come into contact with the lower stop 14 which guarantees that the lower face of the mandrel 18 never comes into contact with the face 16 of the sleeve 8. At the end of the displacement, the shoulder 8a of the sleeve 8 comes into contact with the stop 10. The upper face 15 of the orifice rod 11 always remains in contact with the mandrel 18 and the pin 13 is not in contact with the stop 14. This configuration has the advantage of easily forming the orifice of the tube around the orifice rod 11. The quantity of plastic material 3 is progressively deformed until it fills the cavity formed by the die assembly and the mandrel 18 and is welded to the end of the body of the tube 19. The assembly remains under pressure during the cooling phase.

FIG. 8 shows the same device and the same configuration as the device and the configuration illustrated in FIG. 3, and it differs solely therefrom in the manner in which the quantity of material 3 deposited on the sleeve 8 is illustrated.

The plastic material forming the quantity of material 3 is located both on the upper face 16 and the lateral wall 17 of the sleeve 8.

The quantity of plastic material deposited along or in the extension of the lateral wall 17 of the sleeve 8 is much greater than the quantity of plastic material deposited above the upper face 16 of the sleeve 8.

However, the presence of plastic material above the upper face 16 of the sleeve 8 has several advantages, in particular the fact of efficiently retaining the quantity of material 3 in a specific position. The risk of premature falling of the quantity of material 3 along the sleeve 8 is thus eliminated. It will be revealed here that this risk is present in the device disclosed in the German patent application DE 103 49 837, as in this case, the entire quantity of material is located on the lateral wall of the sleeve.

Surprisingly, it has been observed that the quality of moulded articles was improved if the plastic material was distributed in a specific manner between the areas which are respectively located above and below a plane 20 coinciding with the upper face of the sleeve 8. More specifically, the quality of the moulded articles is improved if the quantity of plastic material 22 located above the plane 20 represents between 20 and 40% of the total mass of the quantity of material 3 and if the quantity of plastic material 21 located below the plane 20 respectively represents between 80 and 60% of the total mass of the quantity of material 3. Preferably, the upper mass/lower mass ratio is approximately 30/70.

It goes without saying that the invention is not limited to the examples shown above.

The invention claimed is:

1. A device for moulding a plastic article in which the article is obtained by the compression of a quantity of plastic material in the molten state between two parts of a mould, comprising at least one supply of plastic material, a rod, slidable in a sleeve suitable for temporarily supporting said quantity of plastic material, a mould for a head of the article, and a mandrel cooperating with said mould, wherein the device comprises non-elastic retaining means that are designed for limiting the bidirectional displacement of the rod in the sleeve, wherein the non-elastic retaining means comprise means for retaining in an upper position and means for retaining in a lower position, and wherein the means for retaining in the lower position are formed by a stop arranged on a lower wall of a lateral orifice arranged on the sleeve and a lateral protuberance arranged on the rod, the lateral protuberance being slidably mounted in the lateral orifice.

2. A device according to claim 1, wherein a maximum free length of the rod protruding beyond an upper face of the sleeve is substantially equal to or slightly greater than a mandrel-sleeve distance measured when the mandrel has reached the mandrel's final lowered position.

3. A device according to claim 1, wherein the non-elastic retaining means form part of the sleeve.

4. A device according to claim 1, wherein the lateral protuberance is formed by a pin which passes through the rod from end to end.

5. A device according to claim 4, wherein the means for retaining in the upper position consist of a shoulder arranged on the rod and a stop arranged towards a lower end of the sleeve.

6. A device according to claim 4, wherein the means for retaining in the upper position consist of said lateral protuberance and a stop arranged on an upper wall of said lateral orifice.

7. A device according to claim 1, in which said stop consists of a ring arranged in a groove formed in said lower wall.

8. A device according to claim 1, wherein in the lower position, the rod emerges from an upper face of the sleeve at a distance which is less than the thickness of the article to be moulded.

9. An assembly consisting of a device as defined in claim 1, and a quantity of plastic material arranged temporarily on an upper face and a lateral wall of the sleeve before compression moulding, wherein an amount of plastic material arranged above a plane coinciding with an upper face of the sleeve is between 20% and 40% of the total mass of the quantity of plastic material.

10. A method for moulding a quantity of plastic material by means device as defined in claim 1, wherein the quantity of plastic material is deposited on an upper face and on a lateral wall of the sleeve so that an amount of plastic material arranged above a plane coinciding with the upper face of the sleeve is between 20% and 40% of the total mass of the quantity of plastic material before compression moulding.

11. A device for moulding a plastic article in which the article is obtained by the compression of a quantity of plastic material in the molten state between two parts of a mould, comprising at least one supply of plastic material, a rod, slidable in a sleeve suitable for temporarily supporting said quantity of plastic material, a mould for a head of the article, and a mandrel cooperating with said mould, wherein the device comprises non-elastic retaining means comprising at least two different structures that are designed for limiting the bidirectional displacement of the rod in the sleeve, wherein the non-elastic retaining means comprise means for retaining in an upper position and means for retaining in a lower position, and wherein the means for retaining in the lower position are formed by a stop arranged on a lower wall of a lateral orifice arranged on the sleeve and a lateral protuberance arranged on the rod, the lateral protuberance being slidably mounted in the lateral orifice.

12. A device according to claim 11, wherein a maximum free length of the rod protruding beyond an upper face of the sleeve is substantially equal to or slightly greater than a mandrel-sleeve distance measured when the mandrel has reached the mandrel's final lowered position.

13. A device according to claim 11, wherein the non-elastic retaining means form part of the sleeve.

14. A device according to claim 11, wherein the lateral protuberance is formed by a pin which passes through the rod from end to end.

15. A device according to claim 14, wherein the means for retaining in the upper position consist of a shoulder arranged on the rod and a stop arranged towards a lower end of the sleeve.

16. A device according to claim 14, wherein the means for retaining in the upper position consist of said lateral protuberance and a stop arranged on an upper wall of said lateral orifice.

17. A device according to claim 11, in which said stop consists of a ring arranged in a groove formed in said lower wall.

18. A device according to claim 11, wherein in the lower position, the rod emerges from an upper face of the sleeve at a distance which is less than the thickness of the article to be moulded.

* * * * *